UNITED STATES PATENT OFFICE.

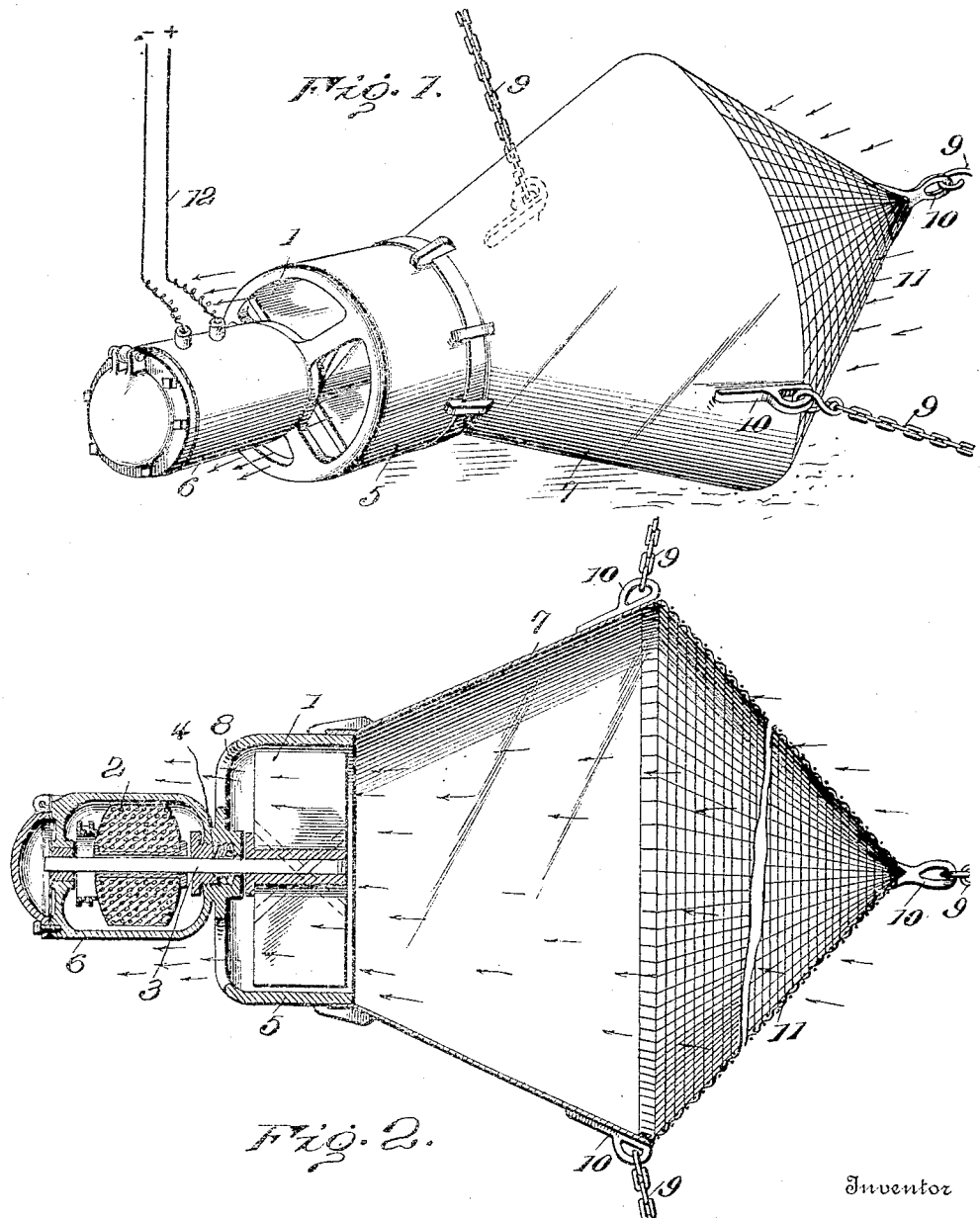

ELBERT A. CORBIN, OF PHILADELPHIA, PENNSYLVANIA.

POWER-CONVERSION PLANT.

1,123,491. Specification of Letters Patent. Patented Jan. 5, 1915.

Application filed May 12, 1913. Serial No. 767,023.

*To all whom it may concern:*

Be it known that I, ELBERT A. CORBIN, a citizen of the United States, and a resident of Philadelphia, in the county of Philadelphia and State of Pennsylvania, have invented a new and useful Power-Conversion Plant, of which the following is a specification.

This invention relates to means for developing water power, and, more particularly, to means for utilizing the force of eddies, rapids, and river currents as distinguished from water falls and plants in which the water is impounded. In this regard it comprehends means for the direct conversion of the water power into useful energy, as electricity, for immediate use for lighting, heating, or power purposes, or which may be stored away for future use.

The nature, characteristic features and scope of the invention will be more readily understood from the following description taken in connection with the accompanying drawings, in which—

Figure 1 is a perspective view of a power conversion plant embodying my invention. Fig. 2 is a sectional view of the same.

Referring to the drawings, the numeral 1, indicates a turbine or water wheel of any appropriate design, and 2, indicates a suitable electric generator. They are directly coupled, that is to say are mounted on a common shaft 3, that is adapted for rotation in appropriate bearings, including a stuffing-box or other suitable water-tight connection 4, between the turbine shell or casing 5, and the water-tight shell or casing 6, of the generator.

The turbine shell is equipped with a water intake or feed cone 7, disposed in the path of the current, and with effluent ports 8.

It is evident that water entering the feed cone will drive the turbine and synchronously the generator.

The device as a whole is secured or anchored in a substantially horizontal position on a river bed, for example, by means of chains or cables 9, which fasten to the shackle irons 10. The feed cone is preferably provided with a wire screen or guard 11, the function of which is to exclude objects which otherwise might enter the casing and foul the wheel.

The numeral 12, indicates the conductors, and it is evident that they may lead to a light, heat, or power plant, or to a battery charging plant.

It will be obvious to those skilled in the art to which the invention relates that modifications may be made in details without departing from the spirit and scope of the invention. Hence the invention is not limited other than required by the prior state of the art.

Having described the nature and objects of the invention what I claim as new and desire to secure by Letters Patent is:

A power conversion plant comprising the combination of a generator and turbine having a water tight shell inclosing the generator, a casing connected with the shell and open at each end, and a hollow feed cone projecting and flaring outwardly from the casing and concentrating the flow in the turbine casing.

In testimony whereof I have hereunto signed my name in the presence of two subscribing witnesses.

ELBERT A. CORBIN.

Witnesses:
HENRY WOLFE, Jr.,
JAS. A. RICHMOND.

Copies of this patent may be obtained for five cents each, by addressing the "Commissioner of Patents, Washington, D. C."